US008281913B2

(12) United States Patent
Guggolz et al.

(10) Patent No.: US 8,281,913 B2
(45) Date of Patent: Oct. 9, 2012

(54) TRANSMISSION DEVICE FOR A MOTOR VEHICLE

(75) Inventors: Manfred Guggolz, Leonberg (DE); Werner Hillenbrand, Neuffen (DE); Wilhelmus Kok, Winnenden (DE); David Ulmer, Filderstadt (DE)

(73) Assignee: Daimler AG, Stuttgart (DE)

( * ) Notice: Subject to any disclaimer, the term of this patent is extended or adjusted under 35 U.S.C. 154(b) by 729 days.

(21) Appl. No.: 12/302,703

(22) PCT Filed: May 9, 2007

(86) PCT No.: PCT/EP2007/004084
§ 371 (c)(1),
(2), (4) Date: Apr. 13, 2009

(87) PCT Pub. No.: WO2007/137680
PCT Pub. Date: Jun. 12, 2007

(65) Prior Publication Data
US 2010/0044183 A1    Feb. 25, 2010

(30) Foreign Application Priority Data
May 31, 2006  (DE) .......................... 10 2006 025 277

(51) Int. Cl.
*B60W 10/10* (2012.01)
*B60W 10/02* (2006.01)
*B60W 10/18* (2012.01)
(52) U.S. Cl. ...................... 192/3.55; 192/3.63; 192/218
(58) Field of Classification Search .................. 192/3.61, 192/3.63
See application file for complete search history.

(56) References Cited

U.S. PATENT DOCUMENTS

| 2,550,545 | A | 4/1951 | Findley |
| 3,667,309 | A | 6/1972 | Franz et al. |
| 6,077,190 | A | 6/2000 | Tabata et al. |
| 2002/0062188 | A1 | 5/2002 | Rosi et al. |
| 2006/0179963 | A1* | 8/2006 | Bachmann et al. ............. 74/339 |
| 2007/0209902 | A1* | 9/2007 | Muetzel et al. ............... 192/216 |
| 2008/0065300 | A1* | 3/2008 | Petzold et al. .................. 701/54 |
| 2008/0109143 | A1* | 5/2008 | Bartels et al. .................. 701/67 |
| 2008/0300086 | A1* | 12/2008 | Wheals ......................... 475/248 |

FOREIGN PATENT DOCUMENTS

CH        482 564        12/1969
(Continued)

OTHER PUBLICATIONS

International Search Report dated Aug. 6, 2007 with an English translation (Seven (7) pages).

(Continued)

*Primary Examiner* — David D Le
*Assistant Examiner* — Lillian Nguyen
(74) *Attorney, Agent, or Firm* — Crowell & Moring LLP

(57) ABSTRACT

A motor vehicle transmission device is described. The transmission has an actuating unit, used for canceling a tooth-on-tooth position of coupling elements, wherein the actuating unit actuates a transmission brake when the tooth-on-tooth position is detected. The transmission also has a second actuating unit for actuating a disconnect clutch, the second actuating unit actuating the disconnect clutch when the tooth-on-tooth position is detected. The actuating unit for actuating the transmission brake and the second actuating unit for actuating the disconnect clutch are actuated in coordination with one another, in order to cancel the tooth-on-tooth position.

11 Claims, 4 Drawing Sheets

FOREIGN PATENT DOCUMENTS

| | | |
|---|---|---|
| DE | 196 15 742 C1 | 5/1997 |
| DE | 197 30 746 A1 | 1/1998 |
| DE | 198 26 068 A1 | 12/1999 |
| EP | 0 512 727 B1 | 11/1992 |
| JP | 61-168350 U | 10/1986 |
| JP | 1-182721 A | 7/1989 |
| JP | 1-131036 U | 9/1989 |
| JP | 2-5644 U | 1/1990 |
| JP | 6-280948 A | 10/1994 |
| WO | WO 2004/013517 A1 | 2/2004 |
| WO | WO 2005003601 A1 * | 1/2005 |
| WO | WO 2006010931 A1 * | 2/2006 |
| WO | WO 2006/032317 A1 | 3/2006 |
| WO | WO 2006032317 A1 * | 3/2006 |

OTHER PUBLICATIONS

Form PCT/ISA/220 and Form PCT/ISA/237 dated Aug. 6, 2007 (Six (6) pages).

Transmission of Japanese Office Action dated Jul. 6, 2011 (one (1) page).

* cited by examiner

TRANSMISSION DEVICE FOR A MOTOR VEHICLE

SUMMARY AND BACKGROUND OF THE INVENTION

The invention relates in particular to a motor vehicle transmission device with an activating unit.

European Patent Document EP 0 512 727 B1 discloses a motor vehicle transmission device of generic type, having an actuating unit, which is formed by a central control unit and which is intended to cancel a tooth-on-tooth position of two claw coupling elements. In so doing the actuating unit is intended to engage a disconnect clutch for a brief period before disengaging it again.

The invention provides a motor vehicle transmission device, in which improved characteristics in terms of the dynamic behavior and comfort can be achieved. The invention includes a motor vehicle transmission device having an actuating unit, which is used to cancel a tooth-on-tooth position of coupling elements, and, in particular claw coupling elements.

The actuating unit activates a transmission brake in the event of a tooth-on-tooth position. A transmission brake in this exemplary embodiment, is taken to mean, in particular, a unit which is intended for braking a transmission, especially in order to effect a process of synchronization. An actuating unit is taken to mean, in particular, a closed-loop and/or open-loop control unit, which preferably comprises a computer unit and a memory unit having a corresponding program for the actuation or open-loop and/or closed-loop control of the transmission brake. The term 'intended' is furthermore taken to mean, in particular, that the unit is specially equipped, designed and/or programmed to carry out the described functions.

According to examples of the invention, an advantageously short delay time can be achieved between activation of the transmission brake and its action on the coupling elements. In particular, it is possible to achieve a shorter delay time compared to a disconnect clutch arranged between an internal combustion engine and a motor vehicle transmission. A significant reduction in the average time taken for meshing of the coupling elements or the claw coupling elements can be achieved. The transmission brake can be arranged in proximity to the coupling elements, so that an advantageous power transmission or torque transmission can be achieved from the transmission brake to the coupling elements. In particular, it is possible to avoid a torque transmission for the purpose of resolving a tooth-on-tooth position by way of a splitter box. It is moreover possible to improve the comfort, in that a transmission brake, in particular, can be controlled particularly precisely and reproducibly and fundamentally more so than a disconnect clutch between the internal combustion engine and the motor vehicle transmission. A transmission brake furthermore, in this example, has a limited maximum transmissible torque, thereby at least largely avoiding impact shocks inherent in the system.

In a further development of the invention the motor vehicle transmission device comprises the transmission brake formed by a multi-disk brake. Embodying the transmission brake as a multi-disk brake means that the device can be integrated in an especially simple and compact design, especially if an actuator unit acts upon the disks of the multi-disk brake in order to generate a friction force with a normal force. The transmission brake is advantageously intended for braking a countershaft and for this purpose is most preferably coupled directly to the countershaft, so that the transmission brake can advantageously be used for the synchronization.

In an exemplary embodiment, the motor vehicle transmission device comprises a rheological brake unit, and in particular a magneto-rheological brake unit, a braking action can be adjusted with particular speed and precision. A rheological brake unit, according to this example, includes a brake unit having a medium, the consistency of which can be varied in order to obtain a braking effect. For example, the medium may be a magneto-rheological fluid, the consistency of which can be varied by a magnetic field, preferably continuously from a liquid to an at least largely solid consistency. A magneto-rheological fluid is, for example, a suspension of small magnetically polarizable particles, which are finely dispersed in a carrier liquid. These are generally iron particles in an oil. In a magnetic field the particles are polarized and are ordered in chains along field lines of the magnetic field. The formation of structures causes the suspension to become stiffer. Once the magnetic field is switched off the consolidated material reverts to its original fluid state.

In exemplary embodiments, the motor vehicle transmission device includes a transmission brake formed by a motor-driven brake unit, so that a drive torque opposed to a brake torque may advantageously be generated by the motor-driven brake unit, at least under certain operating parameters, in order to cancel a tooth-on-tooth position. The motor-driven brake unit may be formed by different units that would appear suitable to a person skilled in the art, but to particular advantage would be gained by an exemplary embodiment using an electric motor unit.

The actuating unit is furthermore intended to actuate the transmission brake at least as a function of an operating parameter registered during operation, in order to cancel a tooth-on-tooth position, with the advantage that account can purposely be taken of prevailing marginal conditions. The transmission brake can basically be actuated as a function of various operating parameters that would be found suitable by a person skilled in the art, such as a current gear of the transmission or a gear to be selected and/or advantageously as a function of an acting pressure, a torque build-up or torque profile and/or an acting force, such as, in particular, a force acting on the transmission brake itself. For this purpose the actuating unit preferably has a sensor unit for sensing the operating parameter, although sensor units external to the actuating unit may also be used. Signals picked up from corresponding external sensor units could then preferably be relayed to the actuating unit via bus systems.

In exemplary cases where the actuating unit for actuating the transmission brake has a learning function and is intended to learn, via the learning function, at least one operating parameter for actuating the transmission brake, a self-adapting and optimizing system can advantageously be obtained. An advantageous value can preferably be determined, indicating for example how long and/or with what pressure the transmission brake is preferably and/or purposely to be actuated in the event of specific operating parameters.

In a further embodiment of the invention, the actuating unit is intended to repeatedly actuate or activate the transmission brake in at least one pulsating operating mode in order to cancel a tooth-on-tooth position, thereby advantageously reducing the wear, especially by avoiding unnecessarily high stress loads on the transmission brake, particularly when the transmission brake, over time, is correspondingly activated at greater time intervals and/or at an increased pressure in order to obtain a greater braking action.

The motor vehicle transmission device in further embodiments has an actuating unit for actuating a disconnect clutch, the actuating unit being intended, that is to say being specially designed, equipped and/or programmed to actuate the disconnect clutch when a tooth-on-tooth position is detected, in order to generate a pulse on the coupling elements and thus to cancel the tooth-on-tooth position. The disconnect clutch can advantageously be used also to cancel a tooth-on-tooth position when a motor vehicle is stationary. Unacceptably high torques and/or stresses of the transmission brake can furthermore be avoided by using the disconnect clutch for stronger rotational pulses. A disconnect clutch is here taken to mean, in particular, a clutch which is arranged between an internal combustion engine and a motor vehicle transmission, such as a torque converter, for example, a torque converter lockup clutch and/or in particular an automated friction clutch.

The actuating unit for actuating the transmission brake and the actuating unit for actuating the disconnect clutch are preferably intended for actuation in coordination with one another, in order to cancel a tooth-on-tooth position, or the actuating units are preferably functionally coupled so that desired interactions can purposely be obtained, in which the disconnect clutch, for example, can be activated as a function of a number of pulses of the transmission brake. It is also feasible, depending on the action of the transmission brake and/or of the disconnect clutch, for the actuating unit in question to undertake a correspondingly coordinated actuation of the other unit.

The actuating units may be coupled in various ways that are known in the art, for example in respect of a pulse duration, a number of pulses, etc. The actuating unit for actuating the transmission brake and the actuating unit for actuating the disconnect clutch are advantageously intended to activate the transmission brake and the disconnect clutch at least substantially at the same time. According to examples of the invention, the disconnect clutch fundamentally has a longer delay time, so that two successive pulses to the coupling elements can advantageously be obtained, that is firstly a smaller pulse by using the transmission brake and then a larger pulse by using the disconnect clutch. Should it prove impossible to cancel the tooth-on-tooth position by using the smaller pulse initiated by the transmission brake, the tooth-on-tooth position can be cancelled without time delay by using a larger pulse, initiated by the disconnect clutch, as distinct from a general actuation of the disconnect clutch. The term 'substantially at the same time' is here taken to mean that an exemplary period of less than 40 msec elapses between the activation times of the disconnect clutch and of the transmission brake.

In a further exemplary embodiment of the invention the actuating unit for actuating the transmission brake and the actuating unit for actuating the disconnect clutch are at least in part integrally formed, thereby saving on additional components, overall dimensions, weight, assembly effort and costs.

Further advantages are set forth in the following description of the drawing.

Other objects, advantages and novel features of the present invention will become apparent from the following detailed description of one or more preferred embodiments when considered in conjunction with the accompanying drawings.

BRIEF DESCRIPTION OF THE DRAWINGS

Exemplary embodiments of the invention are represented in the drawing. The description and the claims describe numerous features of the exemplary embodiments.

In the drawing.

DETAILED DESCRIPTION OF THE DRAWINGS

Figure 1:
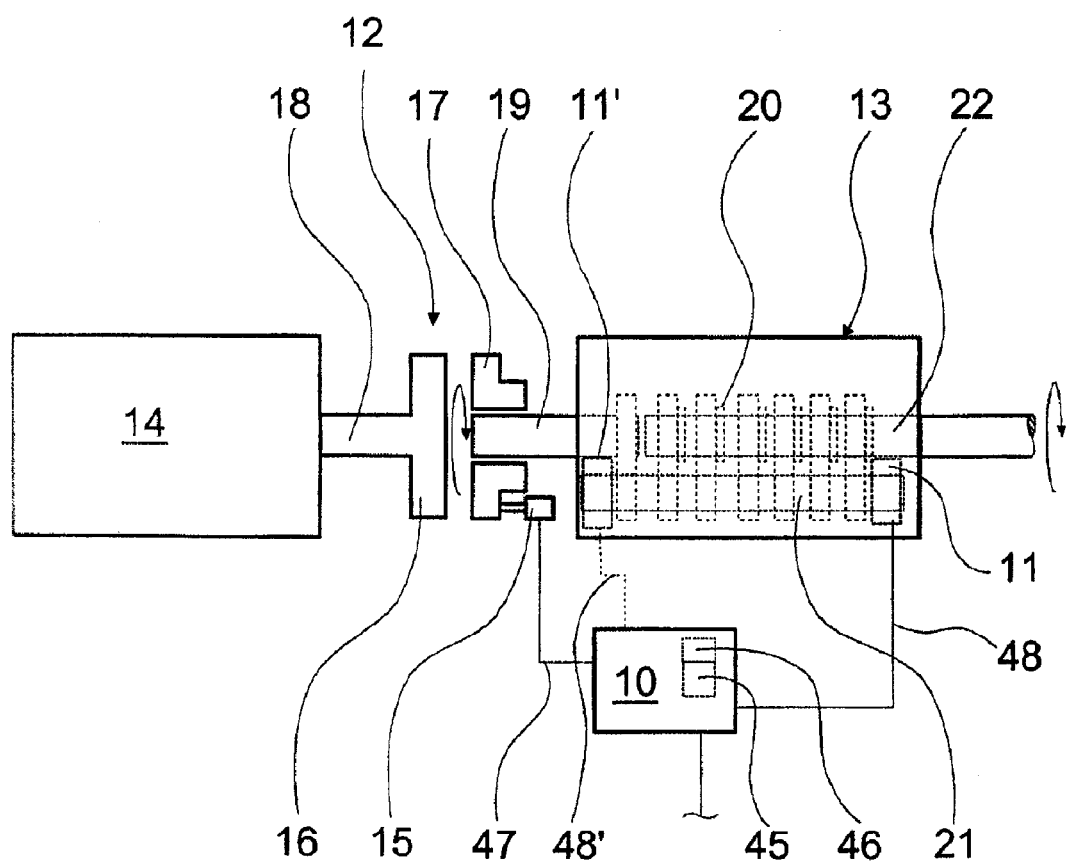
FIG. 1 shows a schematic representation of an internal combustion engine and a motor vehicle transmission having a motor vehicle transmission device.

FIG. 1 shows a schematic representation of an internal combustion engine 14 and a motor vehicle transmission 13 having a motor vehicle transmission device according to an exemplary embodiment of the invention. For example the vehicle may be a truck. An automatically actuated disconnect clutch 12 is connected between the internal combustion engine 14 and the motor vehicle transmission 13. The disconnect clutch 12 has friction disks 16, 17 that can be pressed together by an actuator 15, the friction disk 16 being rotationally locked to an internal combustion engine output shaft 18 and the friction disk 17 being rotationally locked to a transmission input shaft 19.

Figure 3:
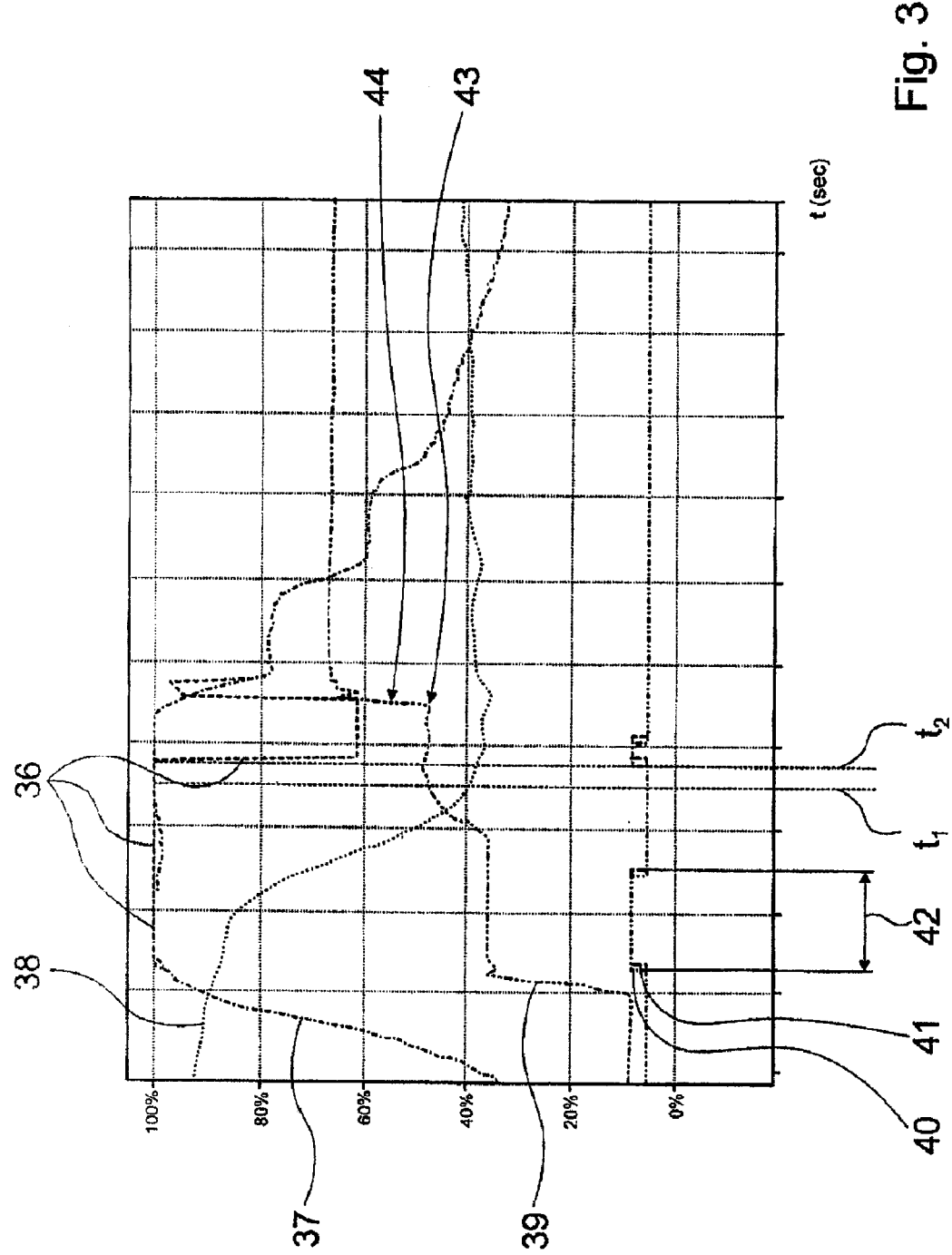
FIG. 3 shows a characteristic curve diagram of a first method sequence.

The motor vehicle transmission 13 moreover comprises an actuating unit 10 formed by an open loop and/or closed loop control unit, which is intended to cancel a tooth-on-tooth position 43 of coupling elements 20 formed by claw couplings with shaft 22 and in this example is intended, in particular, to actuate or to activate a transmission brake 11 of the motor vehicle transmission 13 and the disconnect clutch 12 when a tooth-on-tooth position 43 is detected (FIGS. 1 and 3). For this purpose the actuating unit 10 is coupled by a control line 47 to the actuator 15 and by a control line 48 to the transmission brake 11.

The transmission brake 11 is formed by a multi-disk brake unit, the disks of which can be subjected to a normal force in order to generate a brake force and which is firmly coupled to a free end of a countershaft 21. Alternatively and/or in addition an electric motor-driven transmission brake 11' may also be provided, which may also be coupled to the countershaft 21, for example, as is indicated in FIG. 1. Besides a brake torque for cancelling a tooth-on-tooth position 43, an electric-motor-driven transmission brake 11' may also serve to initiate a drive torque for cancelling a tooth-on-tooth position 43.

Figure 2:
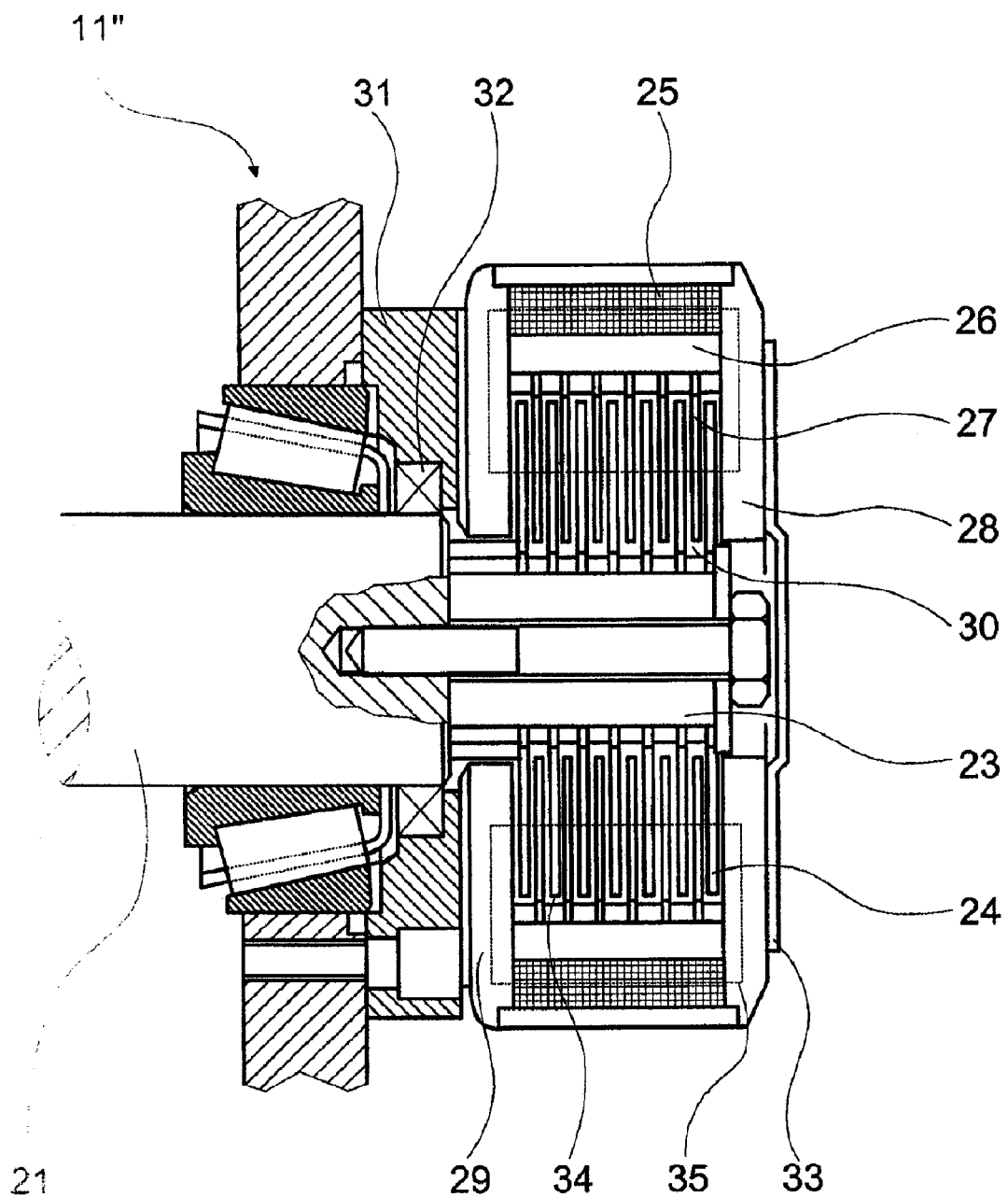
FIG. 2 shows an enlarged representation of a transmission brake.

As an alternative and/or addition to a transmission brake 11 with an actuator for generating a normal force and/or an electric-motor-driven transmission brake 11', a magneto-rheological transmission brake 11" may also be provided, as is represented in FIG. 2. The transmission brake 11" has a rotor 23, which is rotationally locked to the countershaft 21 and on which rotationally fixed disks 24, formed by dynamo sheets and pointing radially outwards, are arranged. The transmission brake 11" further comprises a stator having an annular coil 25, an antimagnetic carrier element 26, disks 27 which are formed by dynamo sheets pointing radially inwards and fixed to the carrier element 26 and which mesh between the disks 24, and iron cores 28, 29 preceding and following the disks 24, 27 in an axial direction. The disks 24, 27 are arranged in a disk space 30, which in the direction of the countershaft 21 is sealed off by a first bearing cover 31 and by a radial shaft seal 32. In the direction remote from the countershaft 21 is sealed off by a second bearing cover 33. The disk space 30 contains a magneto-rheological fluid 34, the consistency of which can be varied by magnetic field lines 35 that can be generated by the annular coil 25, in such a way that by applying a magnetic field the fluid 34 can be continuously converted into a virtually solid medium.

In a first example of the invention, the actuating unit 10 coordinates the actuation of the disconnect clutch 12 and the transmission brake 11 with one another, in order to cancel a tooth-on-tooth position 43 (FIG. 3). In FIG. 3 a set clutch travel 36, an actual clutch travel 37, a countershaft rotational speed 38, a gear travel 39 and an activation signal 40 of the transmission brake 11 and a valve activation signal 41 of a hydraulic valve of a hydraulic actuator unit of the transmission brake 11 are represented over the time t. At 100% the disconnect clutch is fully opened.

If after a synchronization sequence 42 a tooth-on-tooth position 43 is detected by the transmission brake 11 at a time $t_1$, at $t_2$ the disconnect clutch 12 and the transmission brake 11 are simultaneously activated, each for a period of time, by the actuating unit 10. The activation of the transmission brake 11 for less than 50 msec and the brief closing of the transmission brake 11 leads after only a slight time delay of approximately less than 100 msec to a brief reduction in the rotational speed of the countershaft 21. In the example shown the rotational pulse caused by the reduction in rotational speed leads to a resolution of the tooth-on-tooth position 43, as can be recognized from the abrupt profile 44 of the gear travel 39. A pressure in the transmission brake 11 in this exemplary embodiment, advantageously remains so small that the transmission brake 11 is only subjected to a slight stress. If the pulse caused by the transmission brake 11 had not led to a resolution of the tooth-on-tooth position 43, a rotational pulse generated by the disconnect clutch 12 would have acted on the coupling elements 20 to be coupled with a time lag of approximately less than 100 msec.

The actuating unit 10 actuates the transmission brake 11 and the disconnect clutch 12 as a function of a prevailing speed of the motor vehicle and as a function of a prevailing transmission ratio. The actuating unit 10 furthermore has a learning function and is intended, via the learning function, to learn an operating parameter for the actuation of the transmission brake 11, that is a value for the length of time for which the transmission brake 11 is to be activated. At the beginning of a learning phase the transmission brake 11 tends to activated for too brief a period of time. During the learning phase the period of time is increased until it is detected that a pulse can be achieved, which with the desired probability will lead to cancelling of the tooth-on-tooth position 43. For this purpose the actuating unit 10 includes a computer unit 45 and a memory unit 46, in which an operating program is stored and in which operating parameters registered by sensor units (not shown) and newly determined operating parameters for the actuation of the transmission brake 11 are stored.

Figure 4:
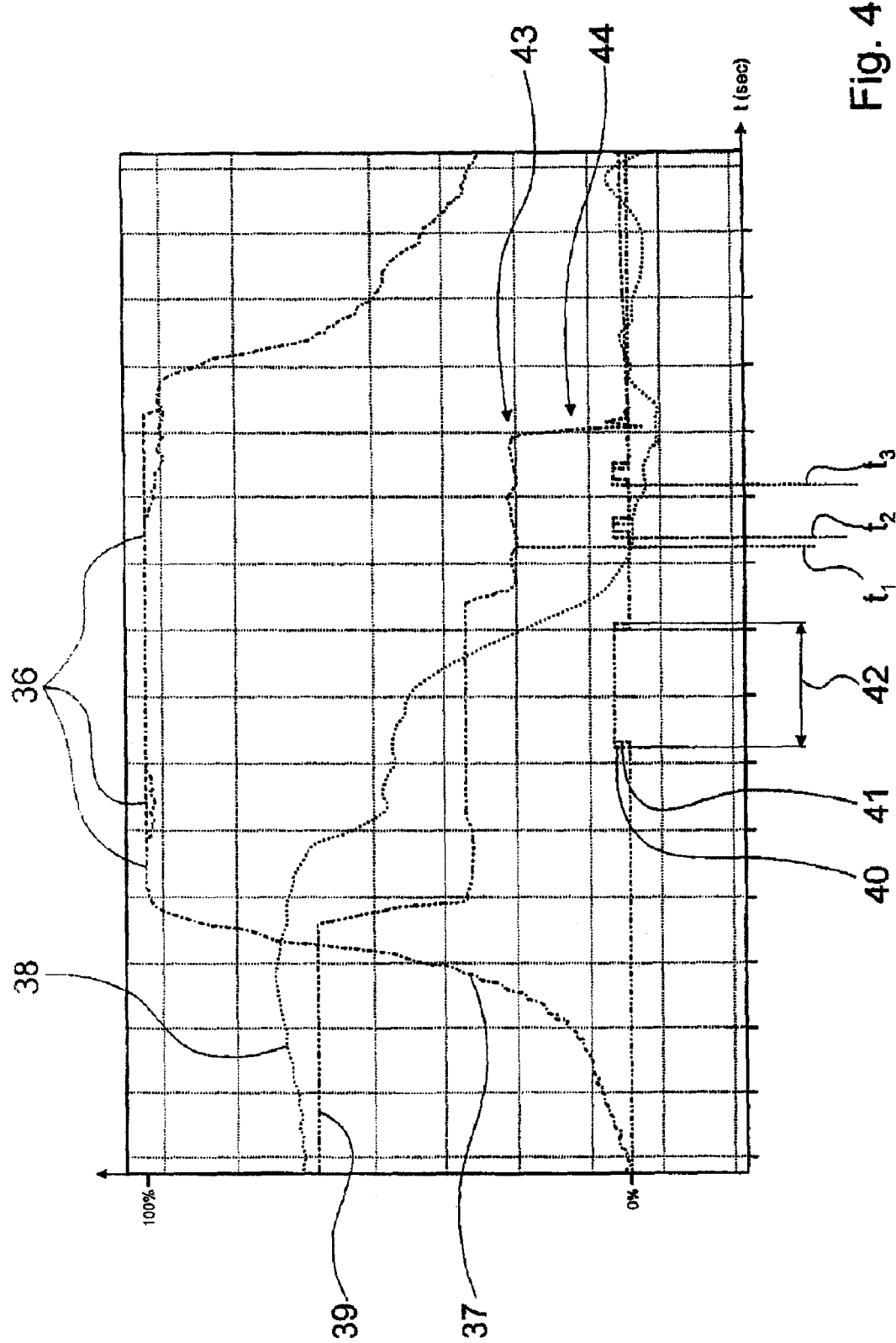
FIG. 4 shows a characteristic curve diagram of a second method sequence.

In an alternative exemplary embodiment, in a method shown in FIG. 4, the transmission brake 11 alone is actuated by the actuating unit 10 for cancelling a tooth-on-tooth position 43. If after a synchronization sequence 42 a tooth-on-tooth position 43 is detected by the transmission brake 11 at a time $t_1$, the transmission brake 11 is repeatedly activated by the actuating unit 10 in a pulsating mode at a first time $t_2$ and second time $t_3$ in order to cancel the tooth-on-tooth position 43. As time elapses the transmission brake 11 is activated with ever longer pulses, the duration being increased by 5-20 msec each time with a pause of less than approximately 100 msec on each occasion. The pressure of the transmission brake 11 here advantageously remains so small that the transmission brake 11 is only subjected to slight stress. When a cancelling of the tooth-on-tooth position 43 is detected from an abrupt profile 44 of the gear travel 39, the pulsating activation of the transmission brake 11 is terminated. The disconnect clutch 12 is then closed.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A motor vehicle transmission device comprising:
   an actuating unit, for canceling a tooth-on-tooth position of coupling elements, wherein the actuating unit actuates a transmission brake when the tooth-on-tooth position is detected; and
   a disconnect clutch actuator for actuating a disconnect clutch arranged between an internal combustion engine and the motor vehicle transmission device, the disconnect clutch actuator actuating the disconnect clutch when the tooth-on-tooth position is detected, wherein
   the actuating unit for actuating the transmission brake and the disconnect clutch actuator for actuating the disconnect clutch are actuated in coordination with one another, in order to cancel the tooth-on-tooth position.

2. The motor vehicle transmission device as claimed in claim 1, wherein the transmission, brake is a multi-disk brake.

3. The motor vehicle transmission device as claimed in claim 1, wherein the transmission brake comprises a rheological brake unit.

4. The motor vehicle transmission device as claimed in claim 1, wherein the transmission brake comprises a motor-driven brake unit.

5. The motor vehicle transmission device as claimed in claim 1, wherein the actuating unit actuates the transmission brake at least as a function of an operating parameter registered during operation, to cancel the tooth-on-tooth position.

6. The motor vehicle transmission device as claimed in claim 1, wherein the actuating unit for actuating the transmission brake has a learning function for causing the actuating unit to learn at least one operating parameter for the actuation.

7. The motor vehicle transmission device as claimed in claim 1, wherein the actuating unit repeatedly actuates the transmission brake in at least one pulsating operating mode in order to cancel the tooth-on-tooth position.

8. The motor vehicle transmission device as claimed in claim 1, wherein the actuating unit for actuating the transmission brake and the disconnect clutch actuator for actuating the disconnect clutch activate the transmission brake and the disconnect clutch substantially at the same time.

9. The motor vehicle transmission device as claimed in claim 1, wherein the actuating unit for actuating the transmission brake and the disconnect clutch actuator for actuating the disconnect clutch are at least partially formed integrally.

10. A motor vehicle comprising a motor vehicle transmission device as defined by claim 1.

11. The transmission device according to claim 1, wherein the coupling elements comprise claw coupling elements.

* * * * *